W. J. GEE.
VARIABLE SPEED GEAR AND DISENGAGING COUPLING.
APPLICATION FILED JULY 23, 1919.
1,372,069.
Patented Mar. 22, 1921
4 SHEETS—SHEET 1.
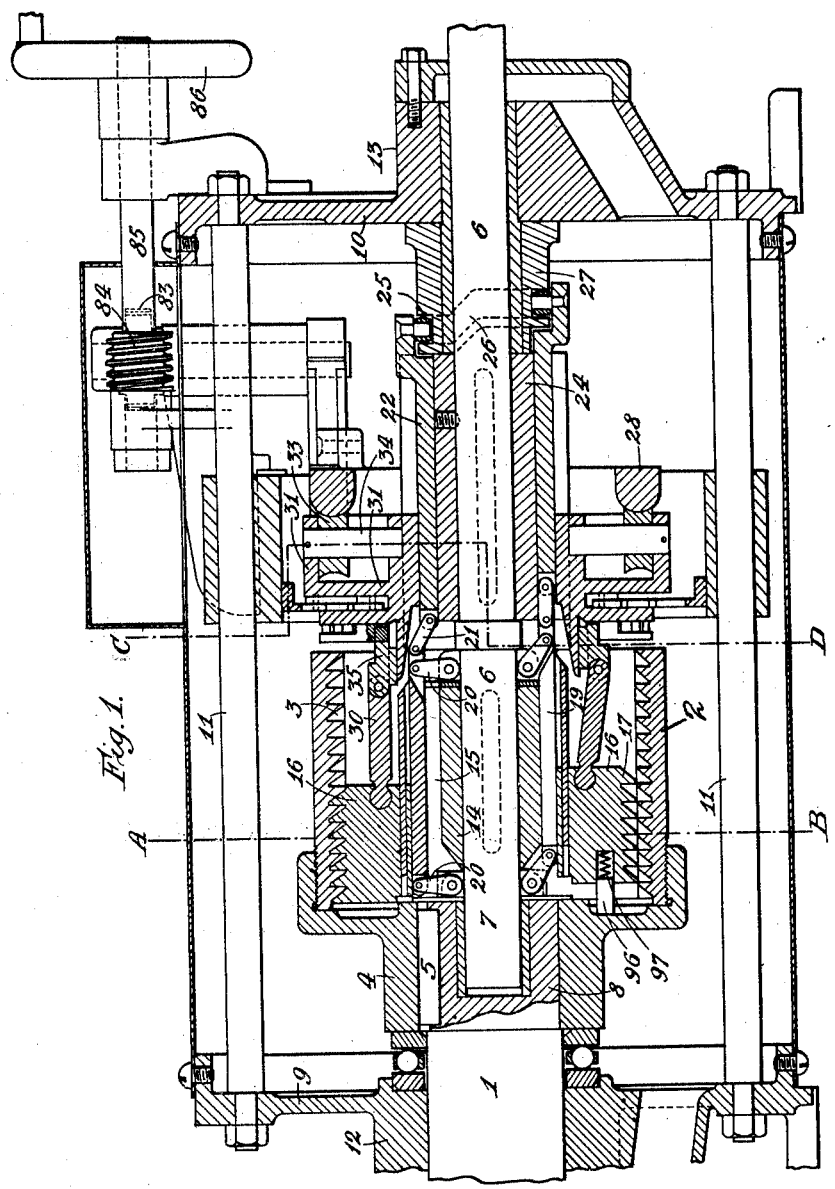
INVENTOR
William John Gee.

W. J. GEE.
VARIABLE SPEED GEAR AND DISENGAGING COUPLING.
APPLICATION FILED JULY 23, 1919.
1,372,069.
Patented Mar. 22, 1921.
4 SHEETS—SHEET 2.
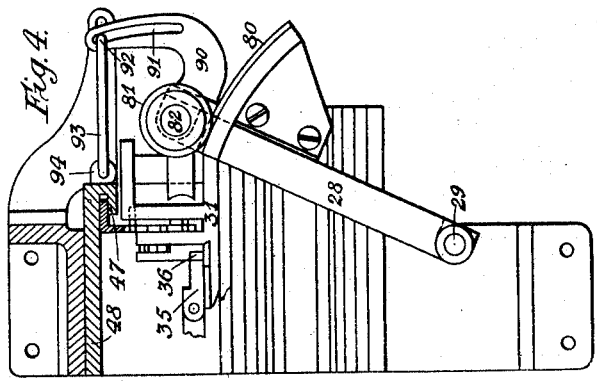
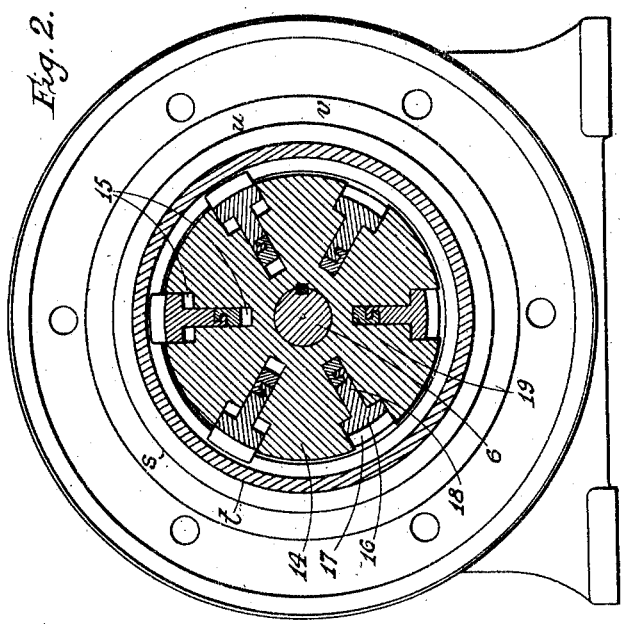

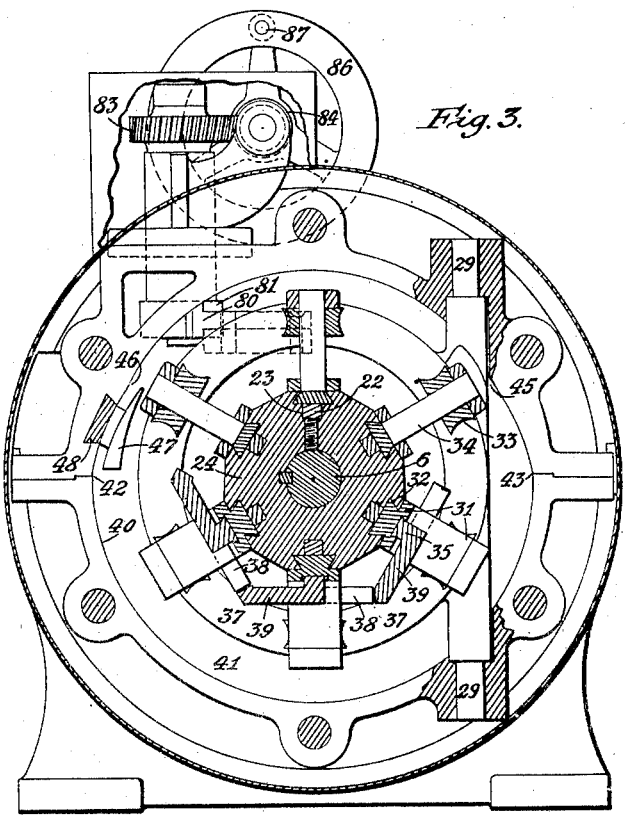

W. J. GEE.
VARIABLE SPEED GEAR AND DISENGAGING COUPLING.
APPLICATION FILED JULY 23, 1919.
1,372,069.
Patented Mar. 22, 1921.
4 SHEETS—SHEET 4.
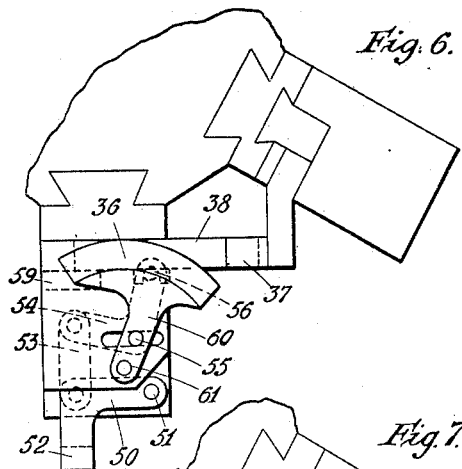
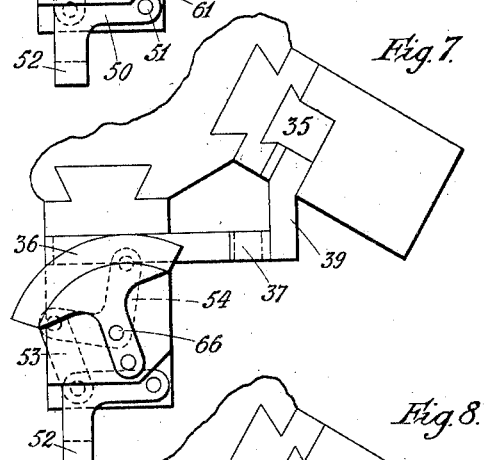
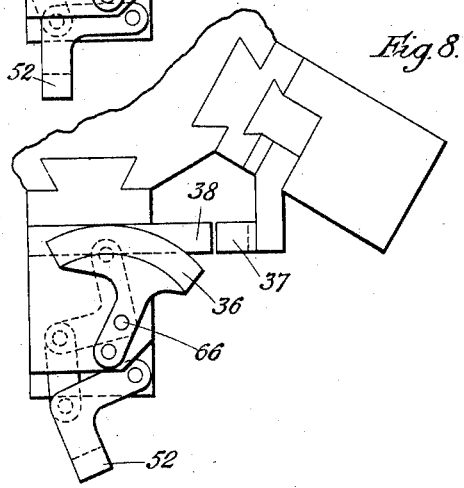
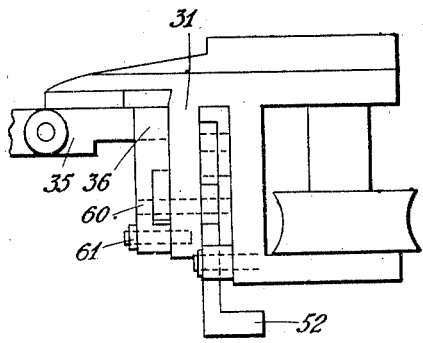
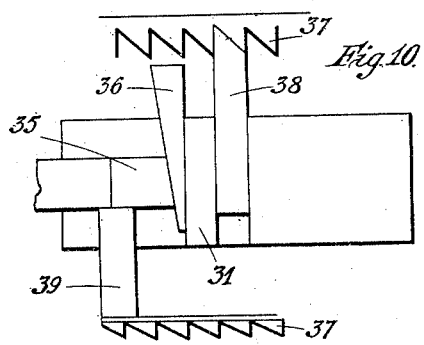
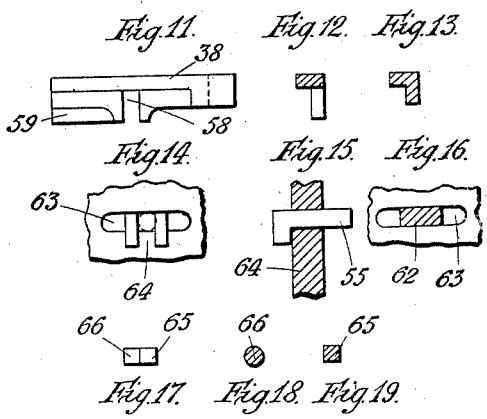
INVENTOR
William John Gee

UNITED STATES PATENT OFFICE.

WILLIAM JOHN GEE, OF TULSE HILL, LONDON, ENGLAND.

VARIABLE-SPEED GEAR AND DISENGAGING-COUPLING.

1,372,069.  Specification of Letters Patent.  Patented Mar. 22, 1921.

Application filed July 23, 1919. Serial No. 312,686.

*To all whom it may concern:*

Be it known that I, WILLIAM JOHN GEE, a subject of the King of England, residing at 48 Kingsmead road, Tulse Hill, London, England, have invented new and useful Improvements in Variable-Speed Gears and Disengaging-Couplings, of which the following is a specification.

This invention relates to variable speed gears or disengaging couplings of the type described in the Patent No. 1,303,287 granted to me on May 13, 1919. In such speed gears the driving and the driven elements are provided with teeth having inclined or wedge-like surfaces, and the speed control is obtained by allowing or causing a definite extent of slip of these wedge-like surfaces one on the other, for which purpose the teeth of one of the elements of the gear are movably mounted to slide thereon. In the construction illustrated in the drawings of the said Patent 1,303,287 the teeth of one element form a continuous internal thread or worm, and the teeth of the other element are arranged upon sections adapted to move axially.

The improvements forming the subject of the present invention chiefly refer to or consist in: a device for inserting the teeth of the movable sections radially into the worm; an arrangement according to which the axes of the two elements are in one line; an improved construction and arrangement of the control guide for varying the speed, and the coöperating rollers of the thrust block; an improved device for the return movement of the movable toothed sections into proper position for reëngagement with the worm.

It has been found that it is advantageous that the teeth of the slidable sections should be completely inserted in or engaged with the worm before they take the load of the drive and for this purpose the teeth are according to the invention inserted radially into the worm before they reach the position in which their axial slip with regard to the worm commences to be controlled by the guide, that is before the control period of the revolution is reached, and are withdrawn radially from the worm after the control period is passed.

The radial insertion and withdrawal of the teeth enable the two elements, that is the worm and the inner element carrying the movable toothed sections, to be arranged coaxially which is an obvious advantage.

To obtain these results the boss which carries the toothed sections may be arranged coaxially with the worm and may be pivoted with slots in which the toothed sections slide axially, which slots are cut deep enough to allow also of radial movement to the desired extent. Each toothed section may for instance be slidably mounted by dovetails or the like connection on a bar which is hinged to the boss by means of a parallel motion. One end of this bar may be connected by a link to a rod sliding in an extension of the slot of the boss, which rod may be actuated axially by a cam path cut on a stationary ring fixed at one end of the driving boss. By this means the rod is at the appropriate points of the revolution moved axially and causes the toothed section operatively connected thereto by a parallel motion, to be moved radially into the worm and out of it. The teeth of the worm may be like a buttress thread and the teeth of the movable sections may be similarly shaped. The thrust blocks preferably do not partake of the radial movement of the toothed sections but are connected thereto by links, the link pivot on the thrust block being for other purposes hereinafter referred to preferably slidable axially with regard to the thrust block and adapted to be fixed by a spacing wedge. When the teeth are fully inserted or engaged in the worm the connecting link between the toothed section and its thrust block is in line with the line of thrust, or parallel to the axis of the gear, and the pressure is transmitted by very large surfaces viz. the entire straight flanks of the teeth. During the radial withdrawal and the insertion of the teeth, the sections, owing to their link connection with the thrust-blocks, are simultaneously moved slightly in the axial direction so that the contact between the teeth of the movable sections and the worm is instantaneously broken at the commencement of the withdrawal and is established only at the end of the insertion. Other means may of course be employed for obtaining this result. For instance, alternatively or in addition to this arrangement provisions may be made that the face of the guide controlling the slip is slightly reduced just before the beginning of the control period and just before the withdrawal position so that it is insured that the teeth which are in engagement and contact with the worm and under the control of the guide, take the load, and that there will be no load on the incoming teeth until they have been completely engaged in the worm and until the spacing wedge, which as will later on be explained is used for the correct registration of the teeth, is inserted to the required extent, and also that at the coming out end of the control area the load is taken off the teeth before or while they are withdrawn.

In order to increase and improve the bearing surface of the rollers of the thrust blocks upon the control guide, the face of the control is according to the invention rounded to a semi-circular form in cross section. The rollers are correspondingly grooved, and consequently the bearing of the rollers on the face of the control guide is always fair and true, whatever the angle at which the control guide is set. The rollers on the thrust-blocks may be adapted to move radially to compensate for the fact that at speeds less than full speed the part of the control guide at the side opposite the pivot of the guide is nearer the axis of the gear than the part at the side of the pivot.

According to the invention the control guide is also used for approximately returning the toothed sections and the thrust blocks to the meshing position. For this purpose the control guide is made in the form of a complete ring, instead of a segment. This ring may be pivoted at one side, the center line of the pivot passing through the center line of the circularly turned face of the control guide. Or the ring may be set by turning about the axis of the gear and simultaneously inclining the ring with regard to the axis by means of cam guides. The return of the toothed sections to the approximate meshing position may be spread over one half revolution.

The exact registration of the teeth into the meshing position and the locking of the toothed sections to their thrust blocks, are according to the present invention effected by one operation, thus combining registration and lock.

To understand clearly this part of the invention it is necessary to bear in mind that the toothed sections carried by the driving boss are equidistantly arranged around the boss and are therefore a fixed distance apart, and that the toothed sections at any moment in contact with the worm, are, at speeds of the driven member less than full speed, traversing or moving axially at the same rate which rate is determined by the angle of the control guide. Therefore the teeth in contact or engagement with the worm are, during their contact, stationary as regards their relative positions. The toothed section which has last engaged with the worm, which for the sake of clearness will hereinafter be referred to as the "key-tooth," may therefore be utilized as a guide for the registration of the incoming tooth to its meshing position. As hereinbefore described the control guide is also the return guide, and the thrust-blocks and toothed sections are brought back the amount of their traverse. In order to register the teeth correctly into engagement with the worm they therefore need to be adjusted over a distance equal at the maximum to the distance of two adjoining teeth. It has been found to be desirable that the registration and locking should in each case start from the zero point and be operated by a device which makes the desired registration and lock afresh for each insertion of each toothed section, which adjustment is brought back to zero again on the withdrawal of the toothed section from the worm. To secure this effect, a cam-path is provided, conveniently on the casing of the gear, which path depresses a pawl or lever carried by the incoming toothed section on its thrust-block. The depression of this pawl by the cam-path inserts between the toothed section and its thrust-block a wedge or spacer which pushes the toothed section the required distance from the thrust-block to secure the correct meshing of the teeth with the worm. On the radial insertion of the teeth into the worm, the thrust is taken by the thrust-block through the spacer, and so an effective lock is arrived at. The wedge or spacer is made of such a slope that it does not tend to unlock under pressure. In order that the spacing wedge shall be inserted between the toothed section and the thrust-block only to the extent required the key-tooth is employed as a guide or indicator in the following manner:—Each toothed section carries a rack with teeth upon it, corresponding to the teeth of the section. This rack is opposite the locking mechanism attached to the thrust-block of the following section, and extends for a distance which covers the greatest possible traverse of the two toothed sections relatively to each other. The depression of the pawl by the cam path protrudes a feeler tooth from the registering movement of the incoming section into the rack of the key-tooth. If it happens that the traverse of the key-tooth since its own registration has been such that the feeler tooth when protruded from the incoming tooth is inserted completely into the rack, no spacer adjustment between the incoming toothed section and its thrust-block will be needed, and the depression of the pawl by the cam-path will be completely used up in inserting the feeler tooth into the rack. But if the feeler tooth meets the rack in such a position that it can be only partly inserted in the rack, then the depression of the pawl operates first to insert the feeler tooth as far as it will go into the rack, and thereafter to insert the spacing wedge between the toothed section and the thrust-block, so that the insertion of the spacing wedge is always dependent on the insertion of the feeler tooth into the rack carried by the key-tooth, and is inversely proportionate thereto. To produce the above effect the movement caused by the depression of the pawl by the casing cam path is directed through a link motion to the feeler tooth and causes the protrusion of the feeler-tooth into the rack. If this movement is stopped by the feeler-tooth not being in a position to be completely inserted into the rack, the pivot about which the feeler tooth movement is made is caused to move, and in moving inserts the spacing wedge for a distance dependent on the position at which the feeler tooth is stopped from moving farther by its contact with the rack. Thus the pawl depression, which is a movement of constant amplitude may give any degree of spacer insertion according to the position of the key-tooth relative to the incoming tooth, and so the key-tooth indicates the meshing and locking position of the incoming tooth. When the toothed section is withdrawn from the worm at the end of the control period, the pawl is lifted by passing a wedge which sets the meshing and locking movement at zero point ready to make the required adjustment again on the next meshing of the teeth in the worm. It will be obvious that the cam-path is so disposed on the casing that it operates the above movement at the correct period of the revolution.

The accompanying drawings show by way of example one construction of the improved gear.

Figure 1 is a vertical longitudinal section, Fig. 2 is a cross section on line A—B of Fig. 1 seen from the right, Fig. 3 is a cross section on the broken line C—D of Fig. 1 seen from the left, Fig. 4 is a fragmentary plan view showing the device for setting the control guide and the device for returning the registering device to the zero position, Fig. 5 is a diagrammatic view illustrating the controlled slip principle on which the gear is founded, Figs. 6, 7 and 8 are detail views showing the registering device in three different positions, Fig. 9 is a longitudinal section corresponding to Fig. 6, Fig. 10 is a diagrammatic plan view corresponding to Fig. 9, Figs. 11 to 19 show details of the registering device.

The driven part of the gear is fixed to the axle 1 and consists of a hollow drum 2 provided with an internal screw thread or worm 3. The worm may have a multiple thread, for instance eighteen threads to a complete turn of the screw the diameter of which may be say 5½ inches. The thread may be a buttress thread of say ¼″ pitch so that a complete revolution of the worm would give a longitudinal traverse of 4½ inches. The worm-drum 2 is carried by a flanged and bossed plate 4 which is fixed to the driven axle 1 by means of a key 5. The driving portion of the gear is mounted on the axle 6 the inner end 7 of which is nested in the inner end 8 of the driven axle. The end plates 9 and 10 which are connected by rods 11, carry the outer bearings 12 and 13 for the driven and the driving axles which are in line.

The driving portion of the gear comprises a slotted boss 14 (Fig. 2) fixed to the axle 6 having six slots 15 arranged equidistantly around the boss. In these slots are guided six toothed sections 16 the teeth 17 of which are sections of a male thread cut to fit the female thread of the worm. These sections 16 are free to slide radially and longitudinally in their slots 15 to a certain extent, but are carried around by the rotation of the boss 14. They are T-shaped in section (Fig. 2) and their stems 18 dovetailed to sliding rods 19. The rods 19 (Fig. 1) are connected by links 20, 20 to the boss 14, and by links 21 to other rods 22 adapted to slide in slots 23 in another boss 24 also fixed to the driving axle 6. The ends of the rods 22 carry rollers 25 which run in a cam-path 26 cut in a collar 27 which is stationary being fixed to the end plate 10.

On the rotation of the driving boss 24 the cam-path 26 cut on the collar 27 will at a given point in the revolution, push the rod 22 along its slot, and, by the parallel-motion connection of the rods 19 to the boss 14 the toothed sections 16 will be protruded radially into engagement with the worm. At another point in the revolution the opposite action will take place and the toothed sections 16 will be withdrawn from engagement with the worm. In Fig. 1 the upper toothed section is shown engaged with the worm and the lower one is out of engagement.

Thus it is arranged that for a portion of a revolution the toothed sections are successively engaged with the worm, and for the remainder of the revolution are out of engagement, the cam path being appropriately cut to effect this movement at the desired points of the revolution. The reason for this movement will appear presently.

The control part of the gear consists of a ring 28 which is carried by pivots 29 (Fig. 3). The pivots are at one side of the ring and are arranged so that the center-line of the pivots passes through the center of the circular section of the control guide-ring as shown in Fig. 4.

Each toothed section 16 is connected by a link 30 to a thrust-block 31. The thrust-blocks 31 are carried in slots 32 in the boss 24 and like the toothed sections they are carried around by the rotation of the boss but are free to slide to the permitted extent in their slots.

Each thrust-block 31 carries a grooved roller 33 on a spindle 34 the groove corresponding with the face of the control guide which is semicircular in cross section. Referring to Fig. 4 it will be seen how this roller adapts itself to the alteration of the position of the control guide at the side opposite its pivot when the control guide is set at positions corresponding to low speeds.

Fig. 5 illustrates the principle of the speed control and shows a portion of the worm 3 with a section 16 engaged in the worm. The control guide 28 is set with its face parallel with the slope of the worm. It is clear that if motion is imparted to the section 16 in the direction of the arrow, the teeth will tend to screw along the worm, and the control arm being parallel with the slope of the worm, there is no obstacle to their doing so. Consequently, after the section has moved to the position $16^1$ it will have traversed, or unscrewed, but the worm will have remained stationary. This illustrates the action at no-speed. But if the control guide is set at the dotted position $28^2$ with its face parallel to the plane of rotation, then the teeth cannot screw along the worm and so they drive the worm forward. Consequently, when the section 16 has moved to $16^2$ (dotted position) the worm will have moved with the teeth as indicated by the dotted lines. This is the action at full speed. The speed imparted to the worm drum will therefore depend on the position at which the control arm is set. If it is parallel with the worm there will be no-speed, if parallel with the plane of rotation there will be full-speed. At intermediate positions the speeds will be intermediate. By simply moving the control guide on its pivot any speed can be obtained between no-speed at the one extreme and full speed at the other. It is not necessary to stop the gear to change the speed, the change, either up or down is made while the gear is running. Of course the gear may also be used as a clutch. It should be noted that the drive at all speeds is positive.

The toothed sections 16 are at a certain point withdrawn radially, are then moved back axially and reinserted radially into the worm. Tracing the complete revolution form one point $t$ (Fig. 2), the teeth are engaged with the worm when they reach point $s$, they remain in engagement until they arrive at point $u$ and are completely withdrawn and clear of the worm by the time they reach the point $v$. During the other half revolution from $v$ to $t$ the teeth and thrust-blocks are traversing backward in their slots until, by the time they reach the insertion point the outward traverse while in engagement with the worm has been completely reversed. The return of the teeth by the distance they have traversed longitudinally during engagement is effected by the lower portion of the control guide 28 which has exactly the same angle, but in the reverse direction so far as the rotating teeth are concerned, as the upper half, and so the teeth are returned to somewhere within the distance of two adjacent teeth of their correct meshing position.

A further adjustment is however necessary owing to the fact that driving and the driven elements, except at full speed, are rotating at different rates. Assuming that the gear is set at so low a speed of the driven member that for one complete revolution of the driving element the drum has only advanced a small distance, say one eighth of an inch. The toothed section on coming back for reëngagement will have to be engaged slightly farther within the drum than last time in order to mesh correctly. In other words the incoming teeth must be adjusted to engage with the worm wherever they find it, and therefore a justifying or registering device is needed whereby the incoming teeth are put into correct position for engagement.

To obtain the small adjustment needed the connection between the toothed sections 16 and the thrust-blocks 31 is through the hinged rod or link 30 which link is connected to a block 35 which is dovetailed to the base of the thrust-block 31. A link movement is carried by the thrust-blocks which adjusts a wedge or spacer 36 between the block 35 and the thrust-block 31 and makes the necessary adjustment. In order that the incoming section 16 shall mesh correctly, the necessary indication is obtained from the last engaged toothed section. This will be called the key-tooth, but it must be remembered that each succeeding section after it has meshed with the worm becomes the key-tooth for the following section. Each of the blocks 35 carries on an arm 39 a short rack 37 the teeth of which rack form in fact a projection so-to-speak continuing the teeth on the toothed section, and this rack is so disposed that it can be engaged by a feeler-tooth 38 projected from the adjusting mechanism on the incoming section 16. (See Figs. 3 and 6-10.) The movement of the feeler-tooth of the incoming section into the rack of the thrust-block 35 of the preceding section and the consequent movement of the spacer of the incoming section are effected during the rotation by a stationary cam path through a link device carried by each toothed section. The cam-path also returns the link device, the feeler-tooth and the spacer to their initial positions after the section has passed a certain point.

The annular cam-path 40 (Fig. 3) is fixed to the rods 11 and has a lower cylindrical portion 41 extending from 42 to 43 of larger diameter, an upper cylindrical portion 44 extending from 45 to 46 of smaller diameter, and connecting portions 43—45 and 46—42. Within the portion 46—42 is longitudinally movable a segment 47 (Figs. 3 and 4) carried by a slide 48 and adapted to be adjusted to the required position by the movement of the control guide. The outer operative surface of the segment is concentric to the surface 46—42 (Fig. 3). Each thrust-block 31 carries the following mechanism for operating its feeler-tooth and spacer-wedge (Figs. 6 to 9): A bent lever 50 is pivoted to the thrust-block 31 at 51 and is provided with an outer hook-shaped portion 52 which is operated first by the cam-surface 43—45—46 and then by the segment 47 corresponding to cam-surface 46—42. This lever 50 is connected by a link 53 to an elbow lever 54 pivoted at 55 and engaging by means of a pin 56 the feeler-tooth 38. This feeler-tooth as shown in detail in Figs. 11, 12, 13 is provided with a vertical slot 58 in which the pin 55 can slide and is guided in a straight line to move transversely to the thrust-block. The movement of the feeler-tooth 38 is determined in one direction by a stop 59 and in the other direction by the rack 37 of the preceding thrust-block. The pivot 55 (Fig. 6) of the elbow lever 54 is not stationary but is mounted on a lever 60 which is pivoted to the thrust-block 31 at 61 and carries at its end the segmental spacer-wedge 36. The pivot 55 is for this purpose carried by a slide-piece 62 guided in a cross slot 63 of the thrust-block 31 and formed at the other end with a slot-guide 64 (Figs. 15 and 16). Into this cross-guide 64 takes the square portion 65 of a pin 66 turnable in the lever 60. In the drawing pins 55 and 66 coincide but this coincidence is not essential. When the thrust-block passes the cam-path portion 43—45 the lever 50—52 is moved from the position shown in Fig. 8 into that shown in Fig. 6. This causes the feeler-tooth 38 to be protruded into the rack 37 of the preceding thrust-block. Should this rack be in such a position that the feeler-tooth may enter completely between the teeth of the rack as shown in Fig. 6 and Fig. 10, then the whole of the movement set up by the depression of the lever 50, 52 is absorbed by the corresponding complete insertion of the feeler-tooth into the rack. There will be no movement of the lever 60 and the wedge 36, but the latter will remain in the initial position as shown in Figs. 8 and 6.

If, on the other hand the feeler-tooth 38 owing to the position of the rack of the preceding thrust-block cannot be completely inserted, the depression of the lever 50 will first cause the feeler-tooth to be inserted into the rack as far as possible and will then cause the spacer wedge 36 to be inserted between the block 35 and the thrust-block 31. This case is illustrated in Fig. 7 in which it is assumed that the feeler tooth 38 can be inserted only a very small distance into the rack. It will be seen from Fig. 7 that as soon as the feeler-tooth 38 is arrested by the rack the fulcrum of the elbow lever is changed from 55 to 56, that is to the point of contact of the elbow lever 54 with the feeler-tooth stem. The pivot 55 then turns through the pivot 66 the lever 60 about its pivot 61 and turns the wedge 36 in a direction opposite to that of the movement of the feeler-tooth. It may be noted that as the pins 55 and 66 are rather near the fulcrum 61, the movement of the wedge is considerably larger than the movement of the pin 55, and consequently the wedge may be made sufficiently slow to be self-locking, and not tend to be thrust out under pressure.

To take another intermediate position as an example, assuming that the feeler-tooth is inserted half way into the rack, then, when it can go no farther, the above change of fulcrum takes place, but as half the movement set up by the depression of lever 50 has been absorbed by moving the feeler-tooth, only half the full possible wedge adjustment will take place. And so for all positions of the rack, the wedge adjustment is inversely proportionate to the degree of insertion of the feeler-tooth into the rack. Now, since the position of the rack is indicative of the key-tooth in the worm, the above movement is an automatic and positive method of registering the incoming toothed section by reference to the key-tooth.

When the thrust-block 31 passes the segment 47 the lever 50 is moved from the position shown in Fig. 6 or 7 into the position shown in Fig. 8 and the whole mechanism is brought to zero that is to say both the feeler-tooth and the wedge are withdrawn. This position of the feeler-tooth and the wedge is shown in Fig. 8.

It may be pointed out that in the construction shown the commencement and the termination of the operation of the registering device precede respectively the commencement and the termination of the operation of the device causing the radial movement of the toothed section, that is to say the registration is completed before the toothed section is completely inserted into the worm radially. In some cases it might be preferable to have two registering devices, one producing a rough registration and the other producing the final registration. For instance a rough registration might be obtained by using inclined cam surfaces rotating with the worm, of the kind described in Specification No. 115857, and the final registration might be produced by wedge spacers. In such an arrangement the radial insertion of the teeth into the worm may advantageously take place between the rough and the final registration.

It may also be pointed out that in some cases the timing of the various operations and the points of insertion and withdrawal of the toothed sections may vary from those adopted in the construction shown in the drawings.

Instead of the grooved rollers shown in the drawings it might in some cases be preferable to use cylindrical rollers of a length sufficient to compensate for the movement of the control ring, that is to say cylindrical rollers having the same length as the spindles 34.

In order to hold the toothed sections in contact with the thrust-blocks during the commencement of the insertion of the wedge, a small spring 97 may be provided in each toothed section, which acting upon a piston 96 tends to move the toothed section to the right, the piston 96 being held longitudinally by the boss carrying the worm drum. One such arrangement is shown in Fig. 1.

A suitable device for setting the control ring is the following: The ring carries a toothed segment 80 which meshes with a pinion 81 mounted upon a spindle 82. On the upper end of the spindle 82 is mounted a worm wheel 83 which is operated by means of a screw 84 adapted to be turned by means of a hand wheel 86 provided with a handle 87.

As the position of the thrust-block at the time when the registering device has to be returned to zero varies considerably according to the position of the control guide, it is necessary to adjust the segment 47 which acts upon the hook-shaped end of the lever 50. As mentioned above this segment is carried by a slide 48, and this slide is adjusted longitudinally by the control arm. For this purpose the control ring is provided with an arm 90 (Fig. 4), formed with a slot 91. A link 93 attached to an eye 94 of the slide engages the slot 91 by means of a pin 92, and is guided axially, so that when the control guide is set, the segment is at the same time longitudinally adjusted.

As will be seen from the drawings the whole gear is completely inclosed in a casing, the casing acting also as an oil bath. To take the end thrust, a thrust ball bearing is provided at the driven end. There is no end thrust on the driving side, the thrust being taken between the ball bearing and the control guide ring on the face of which the rollers of the thrust-blocks run.

I claim:—

1. A variable speed gear or clutch comprising coaxial driving and driven elements having engaging teeth, the teeth on one member being movable thereon; and speed controlling means for causing a definite extent of slip of one set of teeth with relation to the other set of teeth.

2. A variable speed gear or clutch comprising driving and driven elements having engaging teeth, the teeth on one member being movable thereon, speed controlling means for causing a definite extent of slip of one set of teeth with relation to the other set of teeth, and means for radially inserting and withdrawing the movable teeth into and from the other teeth.

3. A variable speed gear or clutch comprising coaxial driving and driven elements having engaging teeth, the teeth on one member being movable thereon, speed controlling means for causing a definite extent of slip of one set of teeth with relation to the other set of teeth, and means for radially inserting and withdrawing the movable teeth into and from the other teeth.

4. A variable speed gear or clutch comprising driving and driven elements having engaging teeth, the teeth on one member being movable thereon, and controlling means for causing a definite extent of slip of one set of teeth with relation to the other teeth and returning axially the movable teeth.

5. A variable speed gear or clutch comprising driving and driven elements having engaging teeth, the teeth on one member being movable thereon, and speed controlling means for causing a definite extent of slip of one set of teeth with relation to the other set of teeth, the said speed controlling means consisting of a complete ring adapted to be set by turning about a pivot passing through one end of the ring.

6. A variable speed gear or clutch comprising driving and driven elements having engaging teeth, the teeth on one member being movable thereon and connected to thrust blocks, a control guide for causing a definite extent of slip of one set of teeth with relation to the other set of teeth, the operative face of the control guide being circular, and the rollers of the thrust blocks being correspondingly grooved and adapted to slide radially on their pivots in order to maintain contact with the control guide.

7. A variable speed gear or clutch comprising driving and driven elements having engaging teeth, the teeth on one member being movable thereon, speed controlling means for causing a definite extent of slip of one set of teeth with relation to the other set of teeth, and means for radially moving the movable teeth into and out of engagement with the other teeth, said means consisting of a parallel motion and a stationary cam path.

8. A variable speed gear or clutch comprising driving and driven elements having engaging teeth, the teeth on one member being movable thereon, speed controlling means for causing a definite extent of slip of one set of teeth with relation to the other set of teeth, means for radially moving the movable teeth into and out of engagement with the other teeth, and means for obtaining exact registration of the movable teeth in the axial direction before insertion into the other teeth, such means being adapted to be controlled by movable teeth already in engagement with the other teeth.

9. A variable speed gear or clutch comprising driving and driven elements having engaging teeth, the teeth on one member being movable thereon, speed controlling means for causing a definite extent of slip of one set of teeth with relation to the other set of teeth, means for radially moving the movable teeth into and out of engagement with the other teeth, and means for obtaining exact registration of the movable teeth with the other teeth before insertion, said means consisting of a spacer wedge arranged between a sliding block and a thrust block carried by a movable toothed section.

10. A variable speed gear or clutch comprising driving and driven elements having engaging teeth, the teeth on one member being movable thereon, speed controlling means for causing a definite extent of slip of one set of teeth with relation to the other set of teeth, means for radially inserting and withdrawing the movable teeth into and from the other teeth, means for registering the movable teeth with regard to the other teeth before insertion, said means consisting of a spacer wedge adapted to be inserted between a movable toothed section and the corresponding thrust block, and a stationary cam surface for actuating the spacer wedge.

In testimony whereof I have signed my name to this specification in the presence of two subscribing witnesses.

WILLIAM JOHN GEE.

Witnesses:
ALICE MAY TOVEY,
S. SOKAL.